(12) United States Patent
Tornare et al.

(10) Patent No.: US 6,471,214 B1
(45) Date of Patent: Oct. 29, 2002

(54) TANDEM AXIAL FACE SEAL FOR PUMPS FOR CRYOGENIC MEDIA

(75) Inventors: Jean Elie Tornare, Arisdorf (CH); Philippe Drouvot, Blotzheim (FR)

(73) Assignee: Cryomec AG, Allschwil (CH)

( * ) Notice: Subject to any disclaimer, the term of this patent is extended or adjusted under 35 U.S.C. 154(b) by 0 days.

(21) Appl. No.: 09/668,271

(22) Filed: Sep. 22, 2000

(30) Foreign Application Priority Data

Sep. 23, 1999 (CH) .............................................. 1739/99

(51) Int. Cl.⁷ ................................................. F16J 15/34
(52) U.S. Cl. ........................ 277/399; 277/358; 277/361; 277/400
(58) Field of Search ................................. 277/358, 361, 277/391, 399, 400

(56) References Cited

U.S. PATENT DOCUMENTS

| | | | | |
|---|---|---|---|---|
| 4,489,951 A | * | 12/1984 | Kataoka et al. ............. | 277/400 |
| 4,799,359 A | * | 1/1989 | Nicoll ............................... | 62/6 |
| 5,924,697 A | * | 7/1999 | Parker et al. ................ | 277/400 |
| 6,109,617 A | * | 8/2000 | Lancy ......................... | 277/369 |

\* cited by examiner

*Primary Examiner*—Anthony Knight
*Assistant Examiner*—E Peavey
(74) *Attorney, Agent, or Firm*—Pauley Petersen Kinne & Erickson

(57) ABSTRACT

A seal suitable for a driveshaft of a pump for cryogenic media. The seal can operate without extraneous confining gas, runs frictionless and assures a long service life, which was unattainable so far. The seal is designed as a tandem axial face seal. A sliding ring has sliding faces on both sides with spiral-shaped grooves terminating at an outer periphery, and the sliding ring is fixedly mounted on a driveshaft. The sliding faces each is adjoined by a sliding ring. The sliding ring is tightly connected via a metal bellows with the housing cover on the pump side, and the sliding ring via the metal bellows with the housing cover on the motor side. With the tandem axial face seal, the pump process pressure is sealed with respect to atmospheric pressure, and only a small, controlled gas leakage occurs. The process gas remains 100% pure.

10 Claims, 3 Drawing Sheets

TANDEM AXIAL FACE SEAL FOR PUMPS FOR CRYOGENIC MEDIA

BACKGROUND OF THE INVENTION

1. Field of the Invention

This invention relates to a tandem axial face seal for installation in pumps used for pumping cryogenic media, in order to seal a driveshaft against an interior of the pump.

2. Description of Prior Art

In what follows, supercooled liquids, starting approximately at −100° C., are understood to be cryogenic media, the components of air in the liquid state, for example, such as nitrogen ($N_2$) at lower than −196° C., oxygen ($O_2$) at lower than −183° C. and argon (Ar) at lower than −186° C., as well as hydrogen ($H_2$) at lower than −253° C. In technical terms, the above mentioned elements in liquid form are called liquid nitrogen (LiN), liquid oxygen (Lox) and liquid argon (LAr) and liquid hydrogen (LH2). Such supercooled liquids are produced on a large industrial scale when atmospheric air is split into its components by cooling and cleaning or, in the case of hydrogen, water is split into its components. The individual pure and liquid components are then stored in special cryogenic tanks under atmospheric pressure and are transported by trucks which are equipped with special cryogenic tanks. A portion of the cryogenic liquid, which is close to the boiling state, evaporates continuously because of a certain unavoidable heat input from the environment. Over a sufficiently long period of time the entire contents of the tank evaporate at unchanged temperatures and with an increasing pressure in the interior of the tank. While transferring cryogenic liquids, for example by pumping from one tank into another, or also when removing liquid, for example for using in an industrial process, it is continuously necessary to battle the undesired evaporation of the liquid. The more cryogenic liquid that evaporates, the more that must be considered a loss. The pumps are particular weak points during the transfer. Upon entering the pump, the conveyed liquid is close to a boiling pressure. Therefore a cryogenic pump must be constructed so that it pumps with a comparatively high suction pressure, and so that the pressure does not fall in the interior of the pump, because in case of miscellaneous underpressures the aspirated liquid would immediately evaporate. The cavitations created can cause the pump to run dry and become damaged. Heat flows continuously and unavoidably into the pump through the housing and the driveshaft of the pump, so that the supercooled medium can easily evaporate, in particular into the chamber of the motor side of the pump wheel, where only the approximate suction pressure of the pump in the pump medium prevails.

Therefore the seal which seals the rotating driveshaft against the pump interior is surrounded by gas, not by liquid. This is a dry-running seal. These seals are customarily known as labyrinth seals. The locally evaporated pump medium at the suction pressure pushes into the seal from the inside of the pump and tries to flow along the driveshaft in the direction of the motor. To minimize this leakage, a filtered confining gas at a slightly lower pressure, for example lower by 0.2 bar than the suction pressure of the pump, is pumped from the motor side of the shaft into the labyrinth seal for building up a counterpressure. In connection with a small cryogenic pump of approximately 40 kW output, approximately 15 standard $m^3$, for example $m^3$ at atmospheric pressure, of nitrogen per hour are required as the confining gas, and with large pumps more than twice that amount is required, just to mention an order of magnitude. This method therefore has one disadvantage that it is necessary to employ a separate confining gas, namely preferably nitrogen, so that a complete unit with a tank, filter and pressure regulator is necessary. Secondly, the use of a confining gas has the inevitable result that the cryogenic process liquid to be pumped is contaminated by confining gas, even though only slightly. These contaminations are more and more objected to by the users and are no longer tolerated in some cases.

Axial face seals with a spiral groove surface have also been used as alternatives to labyrinth seals. On one of their seal ring surfaces, such seals have a number of flat depressions of only about half a hundredths of a millimeter, which lead outward in a spiral shape. If the seal ring with the spiral-shaped grooves rotates in such a rotating direction that the mouths extending obliquely with respect to the ring periphery point in the direction of rotation, then ambient gas enters into the grooves and a dynamic pressure is created between the sliding rings, which provides a permanent gas cushion between the sliding rings, so that these run with essentially no friction. However, it is still necessary to pump a confining gas into the chamber in which the seal is located in order to compensate the suction pressure of the pump. Thus this the disadvantages remain, namely the requirement for installations for making available, filtering and pumping the confining gas, as well as the contamination of the process liquid with confining gas.

SUMMARY OF THE INVENTION

It is one the object of this invention to produce a seal for pumps for cryogenic media which can operate without extraneous confining gas, so that contamination of the pumped medium is impossible, which runs essentially frictionless, and which achieves a long service life, which is unattainable so far.

This object is achieved with a seal for the driveshaft of a pump for pumping cryogenic liquids, which is designed as a tandem seal. A sliding ring, with sliding faces on both sides have spiral-shaped grooves terminating at the outer periphery, is fixedly mounted on the driveshaft. The sliding faces are each adjoined by a sliding ring, which on one side is tightly connected via a metal bellows with the pump housing to be sealed, and on the other side with the pump housing on the motor side.

The seal is shown in the drawings in a longitudinal section taken through the driveshaft of a cryogenic pump.

BRIEF DESCRIPTION OF THE DRAWINGS

This invention will be described in detail in view of the drawings, and its function will be explained, wherein.

DESCRIPTION OF PREFERRED EMBODIMENTS

Figure 1:
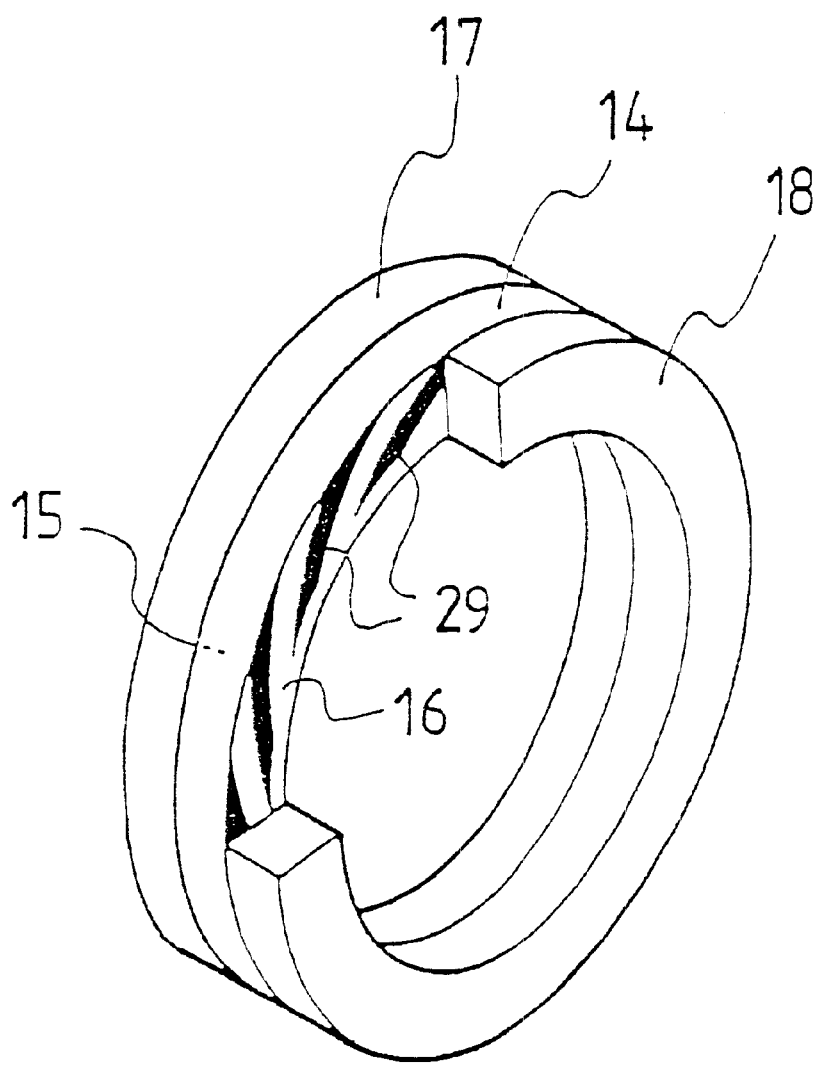
FIG. 1 shows a sliding ring in a perspective top view from a direction of its side, with a view of one sliding face, on which a partially cut open seal ring is seated.

The basis of the seal of this invention is a sliding ring 14 with flat grooves 29 cut in a spiral shape out of the sliding faces 15, 16 of the latter, as shown in FIG. 1, where the sliding ring 14 is shown from the direction of one side. The grooves 29 are only approximately half a hundredths of a millimeter deep. If the sliding ring 14 is turned on its other side, the spiral-shaped grooves 29 provided there would be arranged in a reversed direction. Thus, on the one face, which is shown, the grooves 29 extend outward in a clockwise direction toward a periphery of the sliding ring 14, and exactly reversed on the opposite sliding ring side 15 in a counterclockwise direction outward toward the periphery of the sliding ring 14. If the sliding ring 14 in the drawing rotates in a clockwise direction, the spiral-shaped flat grooves 29 arranged on each of the two sides of the sliding ring 14 extend with their respective mouths leading. If a seal ring 18 is placed against each of the sliding ring sides 14, 15, and if the sliding ring 14 turns with a sufficient speed with the outer mouths of the grooves 29 leading, the outer mouths catch the ambient gas, channel it toward the center of the sliding ring 14 and form a gas cushion each between the sliding ring 14 and the seal ring 18, so that mechanical friction is cancelled. Such seals are basically known.

Figure 2:
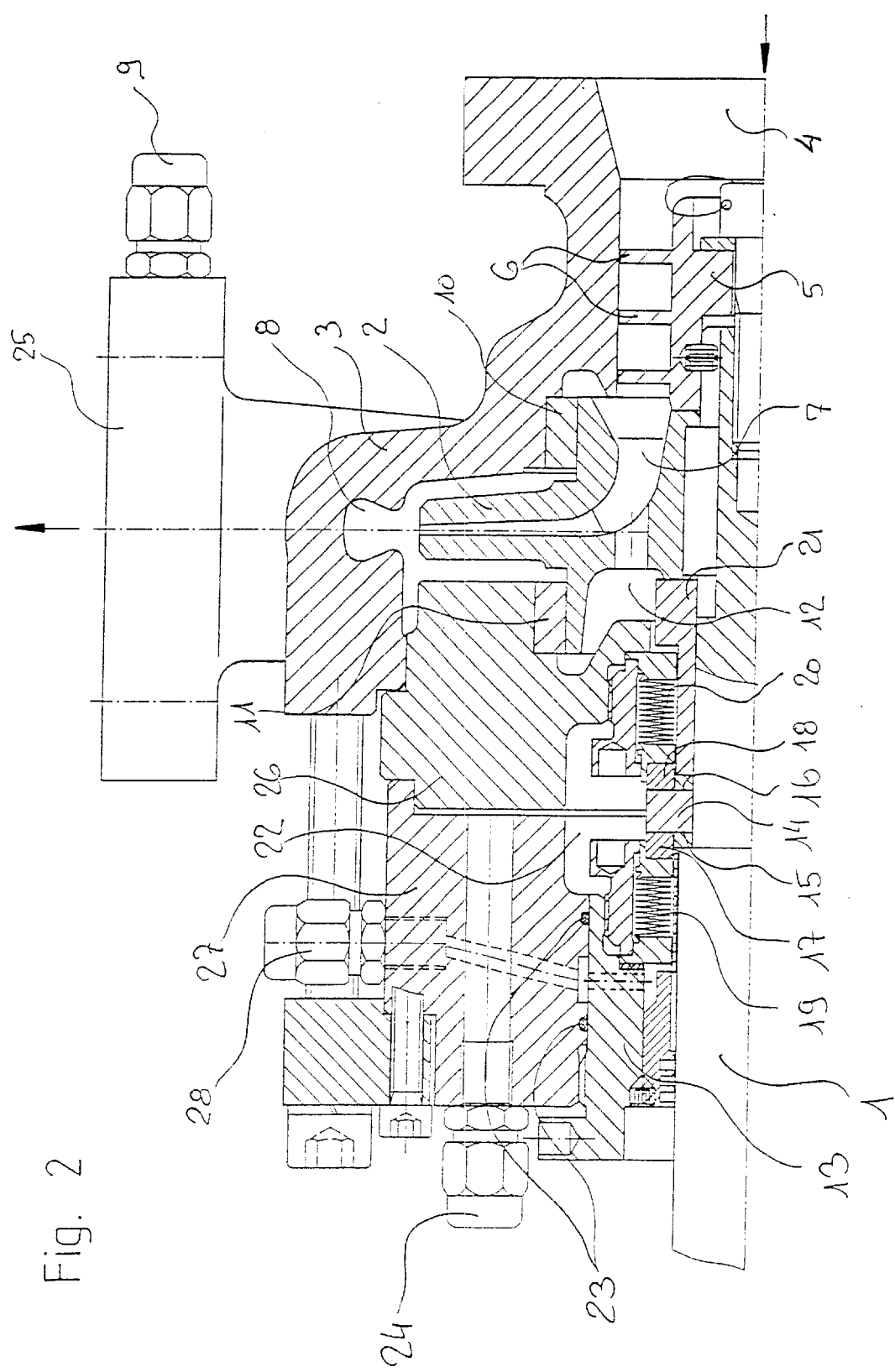
FIG. 2 shows a cryogenic pump with a seal in accordance with this invention, in longitudinal section taken through the center of the driveshaft.

FIG. 2 represents the pump with the essential parts of the novel seal in longitudinal section through the pump driveshaft. Thus the pump motor which is not shown is arranged on the left side, and the shaft extends toward the right and supports the pump wheel 2, which rotates inside of the pump housing 3. The aspirating port of the pump therefore is located on the front end 4 of the pump housing 3. Towards the front, the pump wheel 2 has a worm wheel 5, the outside of which forms a large screw thread, so to speak, so that an Archimedean screw 6 is formed. The corresponding spiral-shaped vane ends in a sharp edge at the front. During rotation, this edge cuts off cryogenic liquid and screws it in the direction toward the pump wheel 2. The cryogenic liquid is accelerated in the conduit 7 of the pump wheel by centrifugal forces acting because of the rotation of the pump wheel 2, and is therefore pushed radially outward. Pumped liquid at an increased pressure is therefore present in the chamber 8, which extends all around the impeller wheel 2 of the pump inside the pump housing 3, and is then conveyed out of the pump housing 3 through the pump outlet 25. The impeller wheel 2 itself is sealed in labyrinth bushings 10, 11 in the pump housing. Cryogenic liquid is also present on the side 12, here on the left, of the pump wheel 2, but can partially evaporate there. The pressure prevailing in it moves around the suction pressure. However, the suction pressure already is higher than the atmospheric pressure, for example 2 bar, otherwise the medium would immediately evaporate because of the aspiration. The pressure in the medium is typically increased to approximately 4 to 6 bar by the pumping. The problem now lies in sealing the chamber to the left of the rotating impeller wheel 2 with respect to the rotating driveshaft, namely in respect to the motor.

To achieve the object proposed, a tandem axial face seal is used for this, which is constructed as follows. First, the sliding face 15, 16 located on both sides of a respective plane of rotation of a sliding ring 14 is inverted on the driveshaft 1 and is clamped together with the worm wheel 5 via all elements 21, 2 located to the right of it, so that the sliding ring 14 rotates together with the driveshaft 1. A sealing ring 17, 18 adjoins each of the sliding faces 15, 16 and is fixedly connected with a metal bellows 19, 20 via respective connecting elements. The metal bellows 19 to the left is stationarily installed in a set screw 13 on the motor side, while the metal bellows 20 on the right side of the sliding ring 14 is stationarily connected with the housing cover 26. It is necessary to obtain as gas-tight a seal as possible on the one side between the chamber 12 to the right of the metal bellows 20, which is mounted under prestress and then extends inside of it toward the left, and the chamber 22 outside of the rotating sliding ring 14, and on the other side between the chamber 22 and the one inside of the sliding ring 14 on its left side, which then extends inside the metal bellows 19 along the driveshaft. To the left of this tandem axial face seal, the set screw 13 is only sealed against the housing cover 27 by means of some O-rings 23. Ideally, for example except for a small unavoidable leakage, no gas should flow from the chamber 12 to the left of the impeller wheel 2 of the pump into the chamber between the rotating driveshaft 1 and the pump housing to the left of the tandem axial face seal. However, the seal and bearing would not function with the arrangement so far described, since a pressure of 2 bar and more prevails to the right of the right metal bellows 20, while atmospheric pressure prevails to the left of the right metal bellows 20. Under these conditions no gas cushion would be built up during rotation, because no gas could get from the periphery between the sealing faces against the pressure applied from the inside, and act as a gas cushion there. Moreover, large amounts of evaporated cryogenic liquid would flow from the pump interior, i.e. from the chamber 12, first inside the metal bellows 20 along the driveshaft toward the left, and then between the stationary seal 18 and the rotating sliding ring 14 radially outward into the chamber 22, and from there on the left side of the sliding ring 14 between the sliding ring 14 and the sealing ring 17 to the driveshaft 1, and finally to the left along the driveshaft 1 to the outside. So that a gas cushion for seating or for eliminating friction can be built up between the sliding ring 14 and the sealing rings 17, 18 adjoining it on both sides, approximately the same pressure must prevail in the chamber 22 as on the inside of the sealing rings 17, 18. Moreover, the sliding ring 14 must be equipped on both sides with grooves, which are arranged in a spiral shape and terminate toward the outside, and the grooves must extend in the correct direction. Let it be assumed that the driveshaft 1 rotates in such a way that it turns into the drawing plane on the upper side in the drawing, for example when viewed from the right, it rotates in a clockwise direction. In this case the spiral-shaped grooves in the right sliding face must extend in a clockwise direction toward the outside, and those in the left sliding face spirally in a counterclockwise direction toward the outside. To provide the seating without the use of separate confining gas, a small amount of liquid is diverted at the pressure connector 9 of the pump, which is evaporated by supplying heat, for example by means of a heater, and this gas, such as filtered process gas, is pumped through the inlet 24 into the chamber outside of the sliding ring 14 in order to achieve a slight overpressure in the chamber 22 on this side of the sealing ring 18 over the chamber 12 on the other side of the sealing ring 18. Under these conditions the sliding ring 14 can catch gas with its forward rotating groove mouths in the course of rotation and can build up a gas cushion between its faces and each of the adjoining sealing rings 17, 18, so that seating free of friction is assured. By means of the set screw 13, which can be finely adjusted, the sealing ring 17 mounted on the metal bellows 19 to the left of the sliding ring 14 can be mechanically pressed more or less strongly against the sliding ring 14 by the metal bellows being mechanically acted upon by means of pressure from the left in order to compensate the higher pressure prevailing on the other side of the sealing ring 17 as best as possible. In spite of this, a microscopic amount of leakage through the seal formed between the sealing ring 17 and the sliding ring 14 cannot be avoided. This is channeled through the connector 28, but is so small that it can be easily accepted. It approximately amounts to a standard liter per hour, which is a quite negligible amount in comparison with the pump output.

Figure 3:
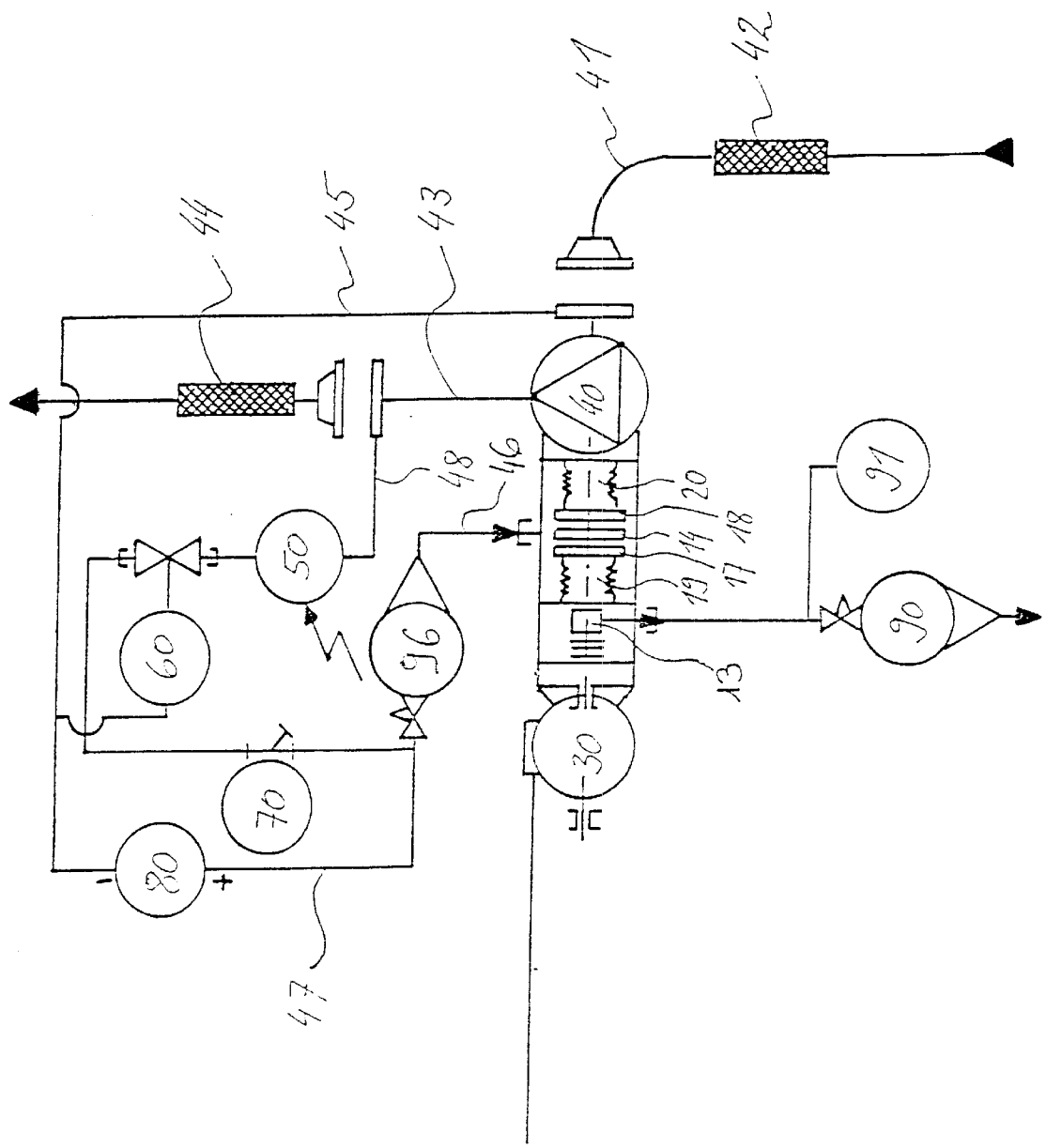
FIG. 3 is a diagram for providing a seal in accordance with this invention, with gas from the pumped liquid for the gas cushion to be built up between the sealing faces.

To automatically regulate the optimum pressure in the chamber 22, and to be also to set the correct contact pressure of the sealing ring 17 against the sliding ring 14, a control circuit is provided, which will be described in connection with FIG. 3. FIG. 3 shows a simplified diagram with only the elements required for producing the control circuit. The drive motor of the pump, in this case an electric motor, is identified by element reference numeral 30, and the pump itself by element reference numeral 40. The pump housing shelters the tandem axial face seal with the already described elements, namely the central, rotating sliding ring 14, the two stationary sealing rings 17, 18 resting against it, as well as the stationary metal bellows 19, 20, with which the sealing rings 17, 18 are connected. The adjusting device, by means of which the contact pressure of the left sealing ring 17 against the sliding ring 14 can be regulated, is indicated by element reference numeral 13. The intention here is to build up a counter pressure in the chamber outside the sliding ring 14 for compensating the pressure prevailing in the pump interior, which corresponds to the suction pressure, so that a gas cushion is built up on both sides of the sliding ring 14 during rotation. The pump 40 aspirates cryogenic liquid via the line 41, which can also be a flexible hose 42, at a suction pressure of 2 bar, for example, and conveys it at a pressure of 4 to 6 bar, for example, through the line 43, possibly also a flexible hose 44, as indicated. Liquid cryogenic medium is now removed upstream of the pump by means of the line 45, and is thereafter conducted through a pressure difference indicator 80. The line 47 is connected on the opposite side of this pressure difference indicator 80 with the pressure line 48, which diverts cryogenic medium downstream of the pump, for example at pump pressure, from the pump line 43. This cryogenic liquid is then conducted through an electric heater 50, so that it evaporates. Thereafter, the process gas thus obtained is conducted through a pressure difference controller 60, and downstream of that also through a gas filter 70. Thus, the pressure of the evaporated pumped liquid medium prevails at the lower side of the pressure difference indicator 80, while the suction pressure of the pump prevails on the upper side of the pressure difference indicator 80. The pressure difference controller 60 permits more or less gas to flow from the direction of the electric heater 50 through the filter 70 and finally through the line 46 into the chamber outside of the sliding ring 14, in order to build therein a counterpressure to the respectively prevailing pressure in the pump housing. The pressure prevailing corresponds to the suction pressure of the pump. The pressure difference controller 60 therefore must let just a sufficient amount of gas pass, so that the pressure difference at the pressure difference indicator 80 is zero or approximately zero. The gas supply on the other side of the tandem axial face seal is determined by means of a flow-through meter 96, and the gas supplied in this way is vented to the outside. The unavoidable leakage to the outside is detected by an additional flow-through meter 90. However, this measurement is not absolutely necessary and remains optional from case to case. A temperature sensor 91 is installed as an emergency stop. If the leakage gas should rise to a temperature of −30° C., the pump motor is stopped. Finally, the pressure with which the left metal bellows 19, and therefore the sealing ring 17 resting at the left of the sliding ring 15, is acted upon is set in such a way that the measured leakage flow is minimal.

What is claimed is:

1. A seal for a driveshaft (1) of a pump for pumping cryogenic liquid, comprising: the seal formed as a tandem axial face seal, a sliding ring (14) with sliding faces (15, 16) on both sides and a spiral-shaped groove terminating at an outer periphery, the sliding ring (14) mounted on the driveshaft (1), the sliding faces (15, 16) each adjoined by a sealing ring (17, 18), one side of each of the sliding faces (15, 16) tightly connected via a metal bellows (19, 20) with a first housing cover (26) on a pump side which is to be sealed and with a second housing cover (27) on a motor side, and a chamber (22) outside of the sliding ring (14) in communication with the cryogenic liquid.

2. The seal in accordance with claim 1, wherein the spiral-shaped groove (29) is flat and within the two sliding faces (15, 16) and is arranged to extend outward in a geometric direction so that during rotation of the driveshaft (1) an outer termination of the spiral-shaped groove (29) precedes grooves on both sides of the sliding ring (14).

3. The seal in accordance with claim 1, wherein the seal seals the driveshaft (1) of the pump (49) for pumping cryogenic liquids.

4. A seal for a driveshaft (1) of a pump for pumping cryogenic liquid, comprising: the seal formed as a tandem axial face seal, a sliding ring (14) with sliding faces (15, 16) on both sides and a spiral-shaped groove terminating at an outer periphery, the sliding ring (14) mounted on the driveshaft (1), the sliding faces (15, 16) each adjoined by a sealing ring (17, 18), one side of each of the sliding faces (15, 16) tightly connected via a metal bellows (19, 20) with a first housing cover (26) on a pump side which is to be sealed and with a second housing cover (27) on a motor side, a chamber (22) outside of the sliding ring (14) supplied with a pump medium through a line (48) branching off a pump outlet, and after heating (50) and filtering (70) the pump medium a control circuit conveys the pump medium into the chamber (22) in a gaseous state at a suction pressure of the pump by a pressure difference controller (60).

5. The seal in accordance with claim 4, wherein a contact pressure of the sealing ring (17) of the tandem axial face seal on the motor side is set by the metal bellows (19) with a set screw, for minimizing leakage between the sliding ring (14) and the sealing ring (17) on the motor side.

6. The seal in accordance with claim 5, wherein the spiral-shaped groove (29) is flat and within the two sliding faces (15, 16) and is arranged to extend outward in a geometric direction so that during rotation of the driveshaft (1) an outer termination of the spiral-shaped groove (29) precedes grooves on both sides of the sliding ring (14).

7. The seal in accordance with claim 6, wherein the seal seals the driveshaft (1) of the pump (49) for pumping cryogenic liquids.

8. The seal in accordance with claim 5, wherein the seal seals the driveshaft (1) of the pump (49) for pumping cryogenic liquids.

9. The seal in accordance with claim 4, wherein the spiral-shaped groove (29) is flat and within the two sliding faces (15, 16) and is arranged to extend outward in a geometric direction so that during rotation of the driveshaft (1) an outer termination of the spiral-shaped groove (29) precedes grooves on both sides of the sliding ring (14).

10. The seal in accordance with claim 1, wherein the seal seals the driveshaft (1) of the pump (49) for pumping cryogenic liquids.

* * * * *